United States Patent [19]

James et al.

[11] Patent Number: 4,925,274
[45] Date of Patent: May 15, 1990

[54] CORRELATION TECHNIQUES

[75] Inventors: Enoch James; Raymond Stafford, both of Stevenage, United Kingdom

[73] Assignee: British Aerospace Public Limited Company, London, England

[21] Appl. No.: 290,872

[22] Filed: Dec. 30, 1988

Related U.S. Application Data

[63] Continuation of Ser. No. 147,191, Jan. 22, 1988, abandoned.

[30] Foreign Application Priority Data

Jan. 22, 1987 [GB] United Kingdom ............... 8701364

[51] Int. Cl.$^5$ ............................................. G02B 27/00
[52] U.S. Cl. ................................... 350/320; 350/321; 350/162.13; 342/64; 358/1.25
[58] Field of Search ........... 350/320, 321, 322, 162.12, 350/162.13; 250/340, 341, 342; 244/3.17; 342/64, 65; 358/125; 364/521, 728

[56] References Cited

U.S. PATENT DOCUMENTS

| | | | |
|---|---|---|---|
| 3,555,179 | 1/1971 | Rubin | 342/64 |
| 3,747,094 | 7/1973 | Gamertsfelder | 342/64 |
| 3,952,299 | 4/1976 | Hodge et al. | 342/64 |
| 4,133,004 | 1/1979 | Fitts | 358/125 |
| 4,164,728 | 8/1979 | Marsh | 342/64 |
| 4,396,903 | 8/1983 | Habicht et al. | 342/64 |
| 4,405,940 | 9/1983 | Woolfson et al. | 358/125 |

Primary Examiner—Bruce Y. Arnold
Assistant Examiner—Loha Ben
Attorney, Agent, or Firm—Cushman, Darby & Cushman

[57] ABSTRACT

An item of interest may be located in a scene image by scanning a reference image containing the item (extracted from a previous image of the scene for example) over the scene image and, for each position of the reference image, correlating corresponding pairs of pixels from the reference and scene images. Herein, to avoid inaccuracies due to bright spots say affecting a small portion of the scene image, for each position of the reference image, all the pixel pairs are correlated and an average similarity value assigned to that reference image position.

1 Claim, 2 Drawing Sheets

PATTERN SHOWING APPROXIMATELY 1 IN 4 PIXELS SAMPLED

PATTERN SHOWING APPROXIMATELY 1 IN 9 PIXELS SAMPLED

CORRELATION TECHNIQUES

This is a continuation of application Ser. No. 07/147,191, filed Jan. 22, 1988, which was abandoned upon the filing hereof.

BACKGROUND OF THE INVENTION

This invention relates to correlation techniques.

In known correlation techniques, a reference image is compared with an image of a viewed scene, the reference image containing an object of interest, for example, a target, which is to be detected within the viewed scene. The reference image is scanned across the image of the viewed scene, and each pixel pair, ie one in the reference image and one in the viewed scene, is compared either by subtraction, multiplication or a more complex operator for each reference image position to form a correlation surface or array. However, these techniques may be sensitive to the presence of bright spots within the viewed scene which are due to external sources and thus may not provide an accurate correlation.

SUMMARY OF THE INVENTION

According to one aspect of the invention, there is provided a method of forming a correlation array for a target within a viewed scene, the method comprising the steps of:

(a) forming a reference array containing the target;
(b) forming a scene array corresponding to the viewed scene;
(c) scanning the scene array with the reference array and determining the minimum value of (W/S, S/W) for each pixel pair of the scene and reference arrays, where W and S are the pixel values of the reference array and scene array, respectively;
(d) summing the minimum values obtained to form a cumulative total for each pixel of the scene array;
(e) applying a conditional threshold value to the cumulative total to determine similarity and dissimilarity between the reference and scene arrays; and
(f) assigning values of zero and one to the correlation array corresponding to whether its associated pixel in the scene array was found to be dissimilar or similar respectively.

Advantageously, a structured sampling pattern may be implemented in which one in four or one in nine pixels are sampled depending upon the target dimensions.

BRIEF DESCRIPTION OF THE DRAWINGS

For a better understanding of the invention, reference will now be made, by way of example, to the accompanying drawings, in which.

DETAILED DESCRIPTION OF THE PREFERRED EMBODIMENT

Figure 1:
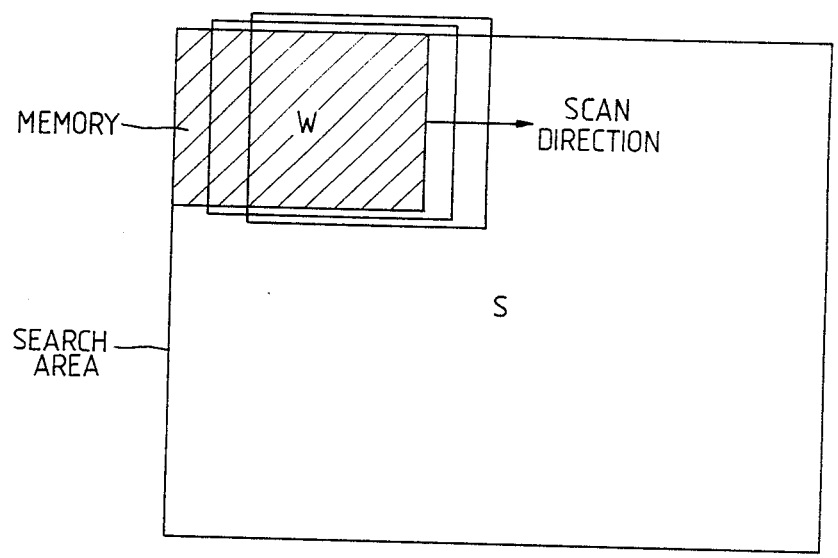
FIG. 1 illustrates a scanning process for a given memory within a given search area.

Consider an image of a scene made up of a two-dimensional matrix of grey level intensities eg ranging between 0 and 255. A search area, S', and a memory, W', are defined as shown in FIG. 1. Both search area S' and memory W' comprise a plurality of pixels, each pixel of search area S' and memory W' having a pixel value S and W, respectively. The memory, W', is just large enough to contain a thermal signature of a target which is to be detected within the scene, whereby the thermal signature may have been obtained from a previous scan of the viewed scene. Thus, the memory W' serves as a reference frame of the target as viewed in the previously viewed scene. The memory is used to search the image of the scene to detect a new target position. It is not necessary to search the whole scene because a search area (as shown in FIG. 1) may be designated which contains a predicted target position and which encompasses all possible target motion between forming the image being correlated and the previous image of the viewed scene.

As shown in FIG. 1, the search area S' is scanned by moving the memory W' sequentially over the search area in a horizontal direction one pixel at a time raster fashion. If the memory has dimensions $M \times N$, and the search area has dimensions $X \times Y$, there are $(X-M+1)(Y-N+1)$ memory positions per search. For each position of the memory within the search area, the correlation function is given by:

$$L = \frac{1}{M \times N} \sum_{1}^{M} \sum_{1}^{N} \min\left(\frac{W}{S}, \frac{S}{W}\right) \quad (1)$$

where
L is the correlation function;
(W/S, S/W) are comparisons carried out on pixel pairs of the memory and the underlying search area.

All values of L obtained form a correlation array or surface, the array having dimensions of $(X-M+1) \times (Y-N+1)$.

It can be seen from equation (1) that a perfect match between the memory and the search area will produce a value of L=1, and a complete mismatch will produce a value of L=0.

Figure 2:
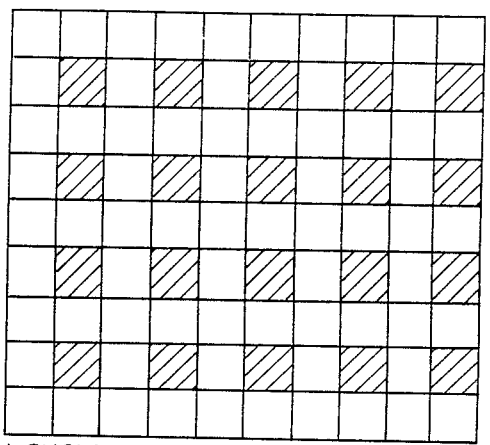
FIGS. 2 and 3 illustrate pixel sampling patterns.
Figure 3:
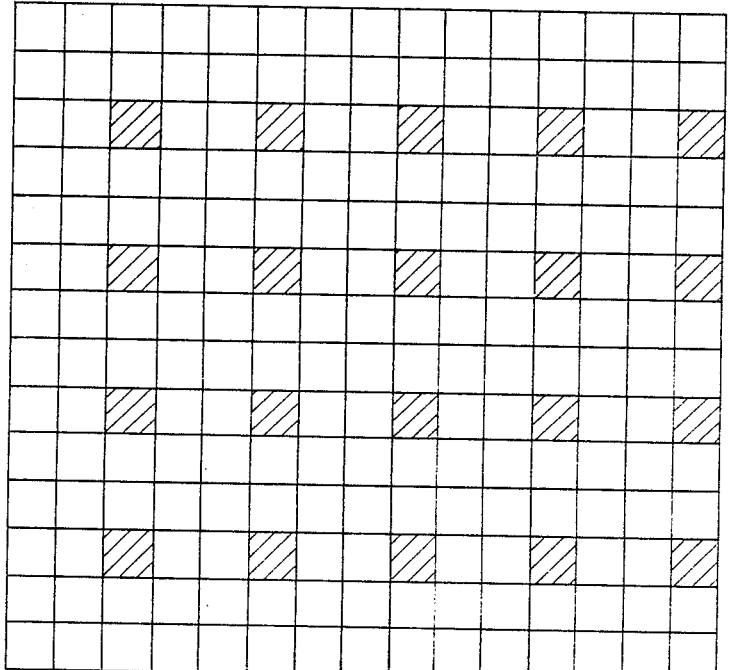

As a large part of the search area will not contain any target information at all, a sampling pattern may be implemented ie a given fraction of the total number of pixel pairs (corresponding search area and memory pixels) can be considered. Referring to FIGS. 2 and 3, only one in four and one in nine pixels, respectively, are sampled, the sampling pattern being determined by the size of the target in terms of the number of pixels. Structured sampling is preferable to random sampling as the target may only occupy a small portion of the memory and if a random sampling technique is used, the target may be ignored completely.

Figure 4:
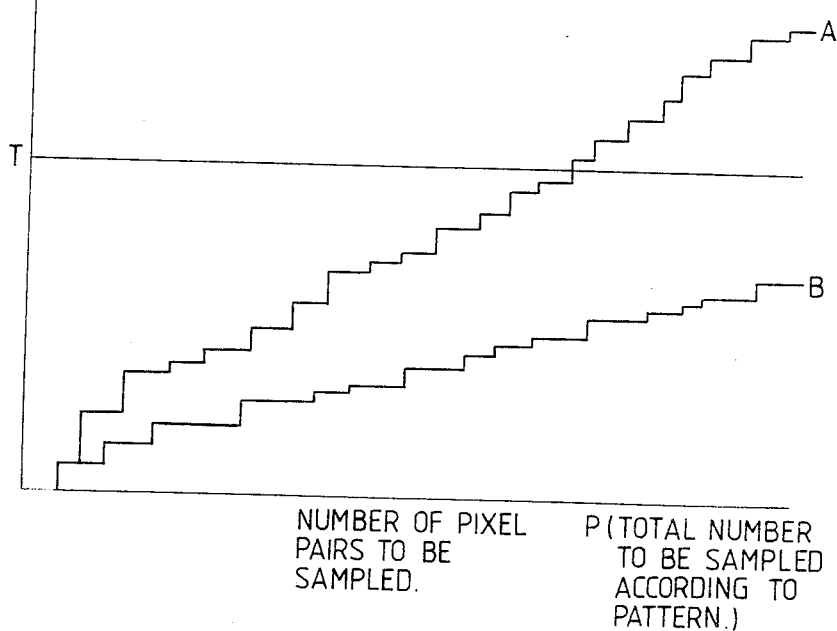
FIG. 4 illustrates the application of a threshold to the cumulative totals of minimum values of (W/S, S/W) for each pixel being sampled.

The value of the minimum of min (W/S, S/W) for each pixel pair referenced is summed together after the total number of samples P has been taken to give a cumulative total. Curves A and B of FIG. 4 are examples of cumulative totals for different positions of the search area S' occupied by the memory M'. This total is then compared with a threshold value T, see FIG. 4. The following criterion applies:

is the total <T, dissimilarity ie L=0
if the total ≧T, similarity

Thus, since the cumulative totals of min (W/S, S/W) exceed the threshold T in curve A, the corresponding position on the search area is designated "similar"; conversely, since the cumulative totals of min. (W/S, S/W)

do not exceed the threshold T in curve B, the designation is "dissimilar".

If the position on the search area currently occupied by the memory is designated 'dissimilar' the correlation array is assigned a value of zero. However, if the designation is 'similar', all the remaining pixel pairs are referenced and equation (1) is implemented in full.

Naturally, the threshold value T varies with the sampling pattern chosen.

We claim:

1. A method of forming a correlation array for a target within a viewed scene, the method comprising the steps of:

(a) forming a reference array containing the target;
   (b) forming a scene array corresponding to the viewed scene;
   (c) scanning the scene array with the reference array and determining a minimum value of (W/S, S/W) for each pixel pair of the scene and reference arrays, where W and S are pixel values of the reference array and scene array, respectively;
   (d) summing the minimum values obtained to form a cumulative total for each pixel of the scene array;
   (e) applying a conditional threshold value to the cumulative total to determine similarity and dissimilarity between the reference and scene arrays; and
   (f) assigning a value of zero or one to the correlation array corresponding to whether its associated pixel in the scene array was found to be dissimilar or similar, respectively.

* * * * *